(12) United States Patent
Sugimoto (10) Patent No.: US 6,846,442 B2
(45) Date of Patent: Jan. 25, 2005

(54) PROCESS FOR PRODUCING GOLF BALL

(75) Inventor: Kazushige Sugimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 127 days.

(21) Appl. No.: 10/261,626

(22) Filed: Oct. 2, 2002

(65) Prior Publication Data

US 2003/0090033 A1 May 15, 2003

(30) Foreign Application Priority Data

Oct. 15, 2001 (JP) ........................ 2001-316148

(51) Int. Cl.[7] ................. B29C 43/18; B29C 43/38; B29C 65/18; B29C 65/70; B29C 37/02

(52) U.S. Cl. ................. 264/161; 264/148; 264/248; 264/250; 264/271.1; 264/279; 264/279.1; 264/320; 425/420; 425/451.2; 425/812; 473/371; 473/373; 473/374; 473/376; 473/377

(58) Field of Search ................. 264/148, 161, 264/248, 250, 271.1, 279, 279.1, 320; 425/420, 812, 451.2; 473/371, 373–377

(56) References Cited

U.S. PATENT DOCUMENTS

| | | | | |
|---|---|---|---|---|
| 695,867 A | * | 3/1902 | Kempshall | 264/248 |
| 1,202,318 A | * | 10/1916 | Roberts | 473/367 |
| 3,068,522 A | * | 12/1962 | Nickerson et al. | 264/275 |
| 3,112,521 A | * | 12/1963 | Ward | 425/126.1 |
| 3,130,102 A | * | 4/1964 | Watson et al. | 156/228 |
| 4,501,715 A | * | 2/1985 | Barfield et al. | 264/248 |
| 5,424,017 A | * | 6/1995 | Hinduja et al. | 264/163 |
| 6,039,910 A | * | 3/2000 | Tanaka et al. | 264/248 |
| 6,120,392 A | * | 9/2000 | Kashiwagi et al. | 473/374 |

FOREIGN PATENT DOCUMENTS

JP 2001-260153 A * 9/2001 ........... B29C/43/02

OTHER PUBLICATIONS

Machine translation of JP 2001–260153 A, May 2004, Japanese Patent Office website.*

* cited by examiner

Primary Examiner—Michael P. Colaianni
Assistant Examiner—Michael I. Poe
(74) Attorney, Agent, or Firm—Birch, Stewart, Kolasch & Birch, LLP (57) ABSTRACT

A process for producing a golf ball which includes the steps of placing a rubber composition into the cavity of a mold having an upper portion and a lower portion, clamping the upper portion and the lower portion together at a moving velocity of from 0.03. mm/s to 1.0 mm/s, causing excess rubber composition to flow out from the cavities; and unclamping the mold and removing from the mold cavity spherical bodies and associated rubber flashers formed in the mold cavities.

8 Claims, 5 Drawing Sheets

PROCESS FOR PRODUCING GOLF BALL

BACKGROUND OF THE INVENTION

This nonprovisional application claims priority under 35 U.S.C. § 119(a) on Patent Application No. 2001-316148 filed in JAPAN on Oct. 15, 2001, which is herein incorporated by reference.

1. Field of the Invention

The present invention relates to a process for producing a golf ball. More particularly, the present invention relates to an improvement in the compression molding processes of a golf ball or a spherical body that forms a part of a golf ball.

2. Description of the Related Art

There exist solid golf balls having a variety of layered structures. For example, there are one-piece golf balls including a single layer, two-piece golf balls including a cover and a core having a single-layered structure, and multi-piece golf balls including a cover and a core having a two-layered structure. The core has a two-layered structure including a center and a mid layer covering over the center. Any of the one-piece golf balls, the cores for a two-piece golf ball, and the centers and the cores for a multi-piece golf ball are spherical bodies, which are usually formed from a rubber composition.

When a core having a two-layered structure is formed, a mold is provided comprising upper and lower portions, both of which having a number of hemispheric cavities. Then, a center and rubber composition which surrounds the center are placed into a cavity (usually the cavity of the lower portion). The total volume of the rubber composition and the center is greater than the volume of the core. As the mold is gradually clamped, excess rubber composition flows out from the cavities. Concomitant with the outflow of the rubber composition, air is also discharged from the cavities. The mold is completely clamped and heated to a predetermined temperature, and then kept for a predetermined period. A crosslinking reaction of the rubber cures the rubber composition, and thus a mid layer is formed. Thereafter, the mold is unclamped, and the core is removed from the cavity. The rubber composition which had flowed out from the cavity is also cured to some extent providing a residue around the cavity in the shape of a ring. The cured matter is referred to as "molding flash." The molding flash is removed from the mold.

Because the mold has a number of cavities as described above, a number of molding flashes having a ring-shape are also formed. The number of molding flashes which are formed are identical with the number of cavities. Usually, from 4 to 100 molding flashes are formed per one mold. Adjacent molding flashes contact each other and become integrated. Therefore, all of the molding flashes are serially connected to result in the formation of a sheet-like shape. If an operator grasps and pulls a part of the molding flashes, the entire flash can be readily removed at once.

Upon clamping, if a large amount of the rubber composition flows out in an omnidirectional manner, adjacent molding flashes can be integrated together without fail. However, the outflow of a large amount of rubber composition leads directly to a decreased process yield, thereby elevating the cost of producing a golf ball. To the contrary, in instances where the amount of the rubber composition outflow is suppressed, some parts of the adjacent molding flashes are not integrated, if the amount of the outflow varies in dependence upon the direction. Accordingly, working property is deteriorated in removing the molding flash. In addition, varying amount of the outflow also leads to deviation of mass of the mid layer (uneven wall thickness).

Problems involving a deteriorated working property when removing the molding flash are also raised upon the compression molding of one-piece golf balls and the cores for a two-piece golf ball, the centers for a multi-piece golf ball, and the like.

SUMMARY OF THE INVENTION

A process for producing a golf ball according to the present invention comprises the following steps (A) to (C):

(A) placing a rubber composition into a cavity of an unclamped mold containing upper and lower portions both of which having a number of hemispheric cavities;

(B) clamping the upper portion and the lower portion together by bringing them into contact with each other by moving the lower portion relatively close to the upper portion at a velocity of from 0.03 mm/s to 1.0 mm/s while causing excess rubber composition to flow out from the cavities; and (C) unclamping the mold to remove the spherical bodies formed in the cavities.

In accordance with the present process for producing a golf ball, the upper portion and lower portion approach each other at an extremely low velocity in the clamping step. When the clamping velocity becomes rapid, the rubber composition intensively outflows to a particular direction whereas when the clamping velocity is set to be very slow, the rubber composition uniformly outflows in all directions around the cavity. Accordingly, adjacent molding flashes join with each other, even though the amount of outflow is suppressed, resulting in a facilitated operation for removing the molding flashes.

Preferably, the process for producing a golf ball involves the introduction of step (D) between the placing step (A) and the clamping step (B) described above, wherein step (D) comprises positioning the lower portion of the mold close to the upper portion of the mold a moving velocity equal to or greater than 3.0 mm/s. In this process for producing a golf ball, the moving velocity in the approaching step (D) is relatively rapid. Therefore, prolonged molding cycle time can be suppressed in spite of the presence of the claming step (B).

Preferably, the clamping step (B) is initiated at a point in time when the space between the upper portion and the lower portion becomes from 5 mm to 30 mm. In accordance with this process for producing a golf ball, uniform outflow of the rubber composition and a shortened cycle time can be achieved to a greater-extent.

Preferably, the percentage ratio of the volume of the matter placed into the spherical cavity to the volumetric capacity of the spherical cavity formed from cavity of the upper portion and cavity of the lower portion is from 103% to 120%.

The process for producing a golf ball according to the present invention exerts especially remarkable effects when the rubber composition is placed into the cavity with the spherical center in a state where the rubber composition is positioned surrounding this center.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

The present invention is hereinafter described in detail with appropriate references to the accompanying drawings.

Figure 1:
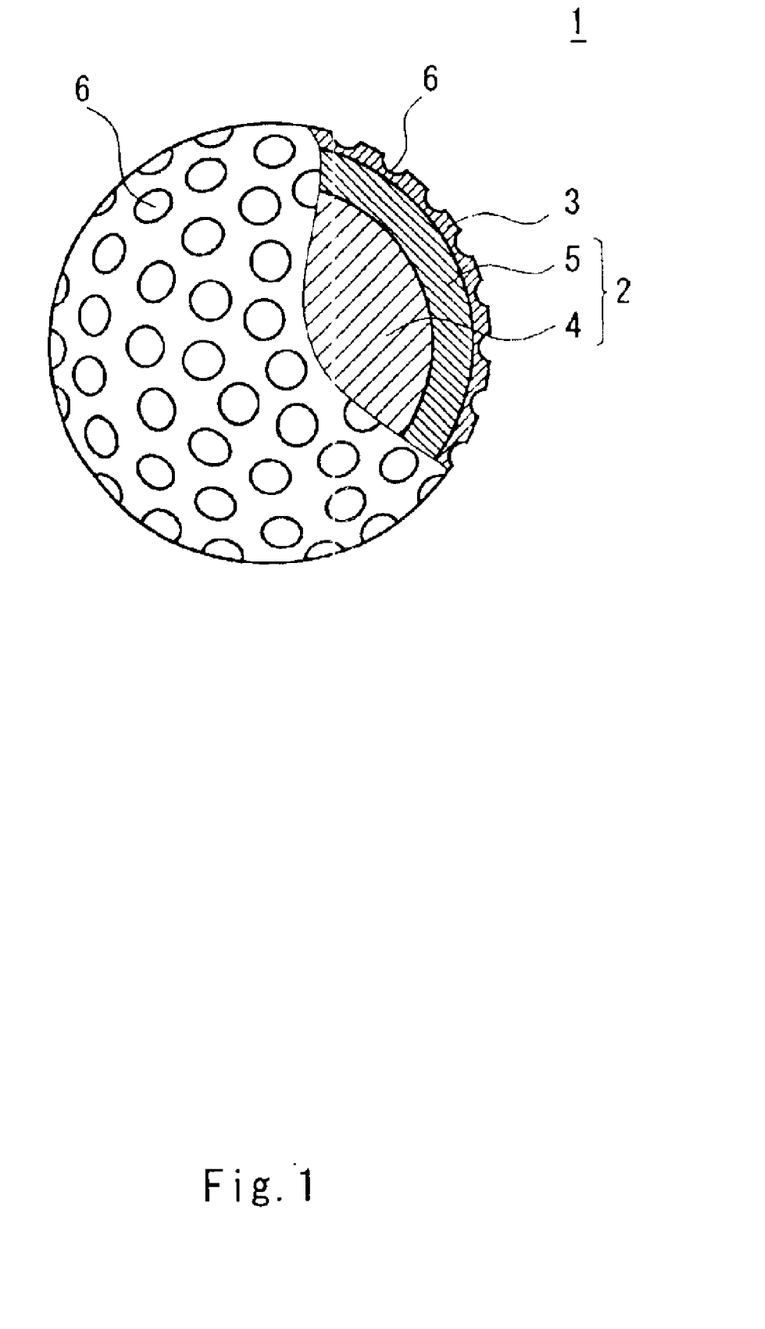
FIG. 1 is a schematic, partially cut-away view illustrating a golf ball obtained by the process according to one embodiment of the present invention.

The golf ball 1, depicted in FIG. 1, has a core 2 and a cover 3. The core 2 has two layers including a center 4 and a mid layer 5. Numerous dimples 6 are formed on the surface of the cover 3. The golf ball 1 has a paint layer and a mark layer on the outer surface of the cover 3, although not shown in the Figure. The golf ball 1 has a diameter of from 40 mm to 45 mm, and in particular, of from 42 mm to 44 mm. In light of the reduction of air resistance in the range to comply with a rule defined by United States Golf Association (USGA), the diameter is preferably from 42.67 mm to 42.80 mm. Further, this golf ball 1 has a weight of from 44 g to 46 g, and in particular, of from 45.00 g to 45.93 g.

Figure 2:
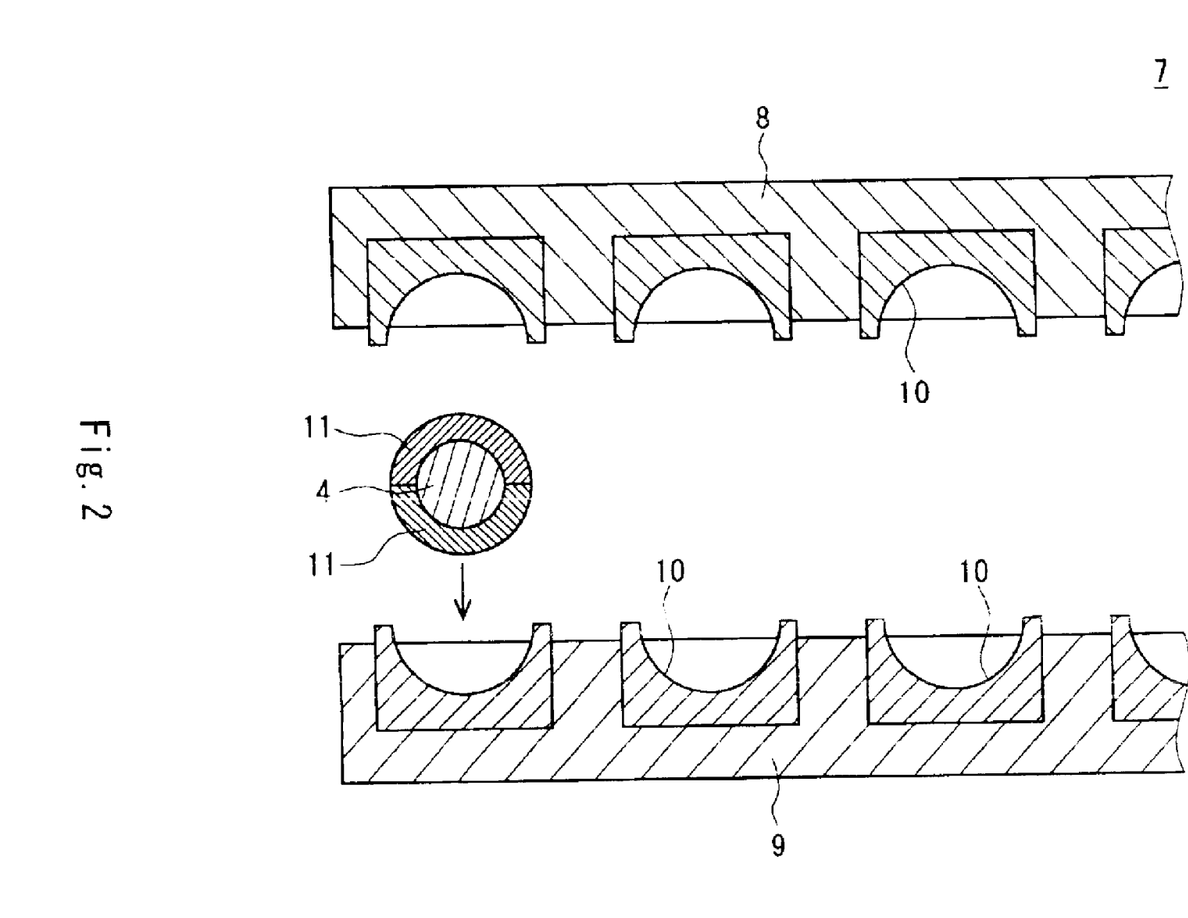
FIG. 2 is a cross sectional view illustrating a part of a mold for use in the production of the golf ball shown in FIG. 1.

FIG. 2 is a cross sectional view illustrating a part of a mold 7 for use in the production of the golf ball 1 shown in FIG. 1. The mold 7 comprises an upper portion 8 and a lower portion 9. Each of the upper portion 8 and lower portion 9 has a number of cavity faces 10. A semispherical cavity is formed by this cavity face 10. When the upper portion 8 and the lower portion 9 are brought into contact, spherical cavities are formed.

Figure 3:
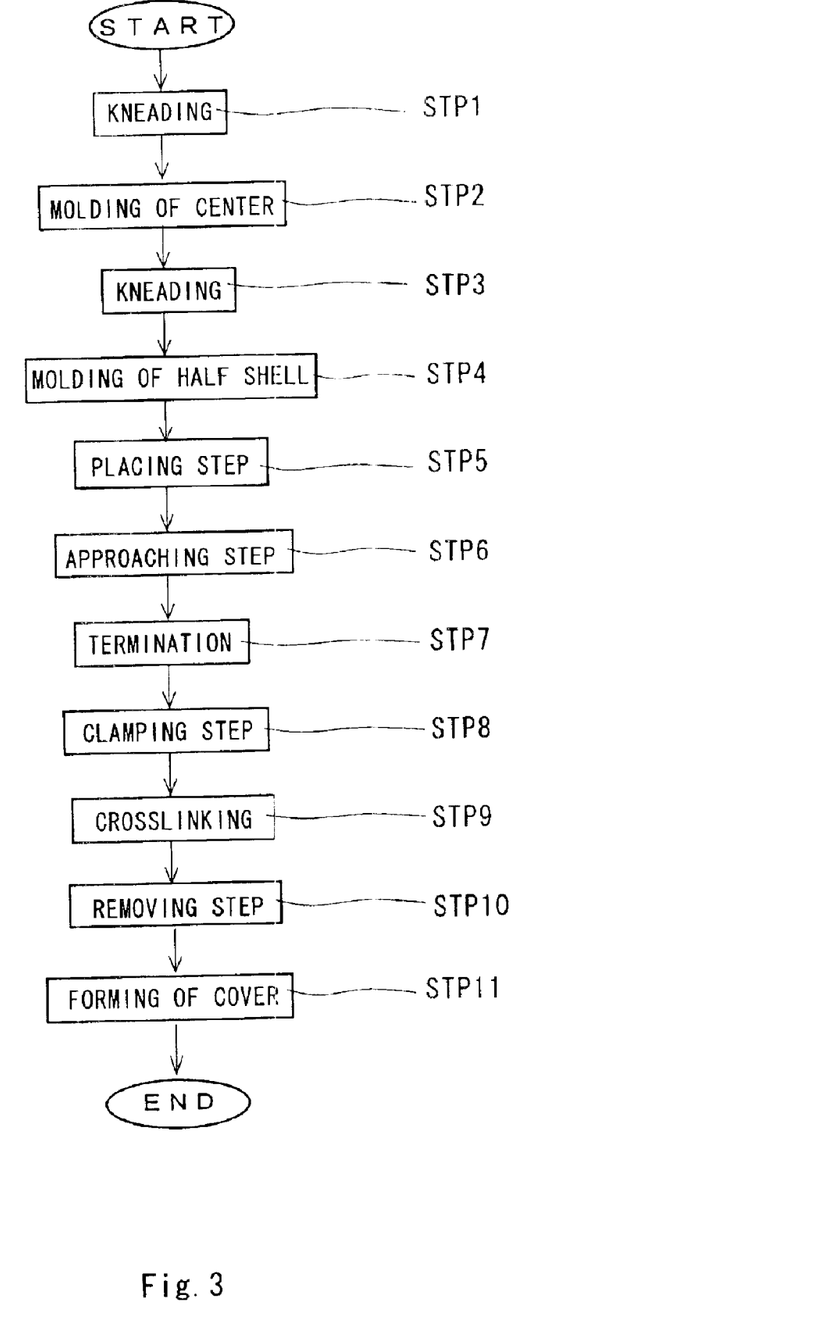
FIG. 3 is a flowchart illustrating one example of the process for producing the golf ball shown in FIG. 1.

FIG. 3 is a flowchart illustrating one example of a process for producing the golf ball shown in FIG. 1. In this process for production, a base rubber, a crosslinking agent, additives and the like are first kneaded (STP 1) to give a rubber composition. Next, this rubber composition is placed into a spherical cavity of a mold followed by compression and heating. Accordingly, a spherical center 4 is formed (STP2). In general, heating initiates a crosslinking reaction, thereby the rubber composition is cured. As a matter of course, the center 4 may be either uncrosslinked or semicrosslinked in this stage.

Next, a base rubber, a crosslinking agent, additives and the like are kneaded (STP3) to give another rubber composition. Thereafter, half shells 11 shown in FIG. 2 are formed from this rubber composition (STP4). In order to form the half shell 11, a mold comprising a hemispherical cavity and a hemispherical protrusion is usually utilized.

Next, the center 4 is covered with two half shells 11, and these half shells 11 and the center 4 are placed into a mold 7 as shown by an arrow head in FIG. 2 (STP5). This step (STP5) is referred to as a placing step. Half shells 11 and the center 4 are usually placed into the cavity of the lower portion 9.

Next, the lower portion 9 gradually moves upwards to get close to the upper portion 8 (STP6). This step (STP6) is referred to as an approaching step. Relative moving velocity of the lower portion 9 toward the upper portion 8 in the approaching step (STP6) is comparatively rapid. Cycle time can be thereby shortened.

Next, upward movement of the lower portion 9 is terminated (STP7). Then, the lower portion 9 moves upwards again (STP8). This step (STP8) is referred to as a clamping step. Relative moving velocity of the lower portion 9 toward the upper portion 8 in the clamping step (STPB) is relatively slow. In the clamping step (STP8), the upper portion 8 and the lower portion 9 gradually get close. Compression of the rubber composition (half shell 11) is accompanied thereby. Generally, temperature of the mold 7 is elevated concurrently with the compression to heat the rubber composition. In accordance with the compression and heating, the rubber composition in the cavity flows, and thus excess rubber composition gradually flows out from the cavity. At the stage when the clamping step (STP8) is completed, the upper portion 8 and the lower portion 9 are brought into contact. Thereafter, the rubber composition rarely flows out.

After the clamping step (STP8) is completed, the mold 7 is kept at a predetermined temperature for a predetermined time period. Accordingly, a crosslinking reaction of the rubber proceeds (STP9), which results in curing of the rubber composition to form the mid layer 5. When the center 4 is uncrosslinked or semicrosslinked, the center 4 is concurrently crosslinked in this step (STP9). In general, the temperature of the mold 7 in the common crosslinking step (STP9) is set to be from 140° C. to 180° C. The time period for crosslinking is set to be from 10 minutes to 40 minutes.

Next, the mold 7 is unclamped, and the core 2 having the center 4 and the mid layer 5 is removed from the cavity. At the same time, the rubber composition which has flowed out from the cavity is also removed. This step is referred to as a removing step (STP10). The cover 3 is formed around the removed core 2 by a known procedure (e.g., an injection molding method) (STP11), to obtain the golf ball 1.

Figure 4:
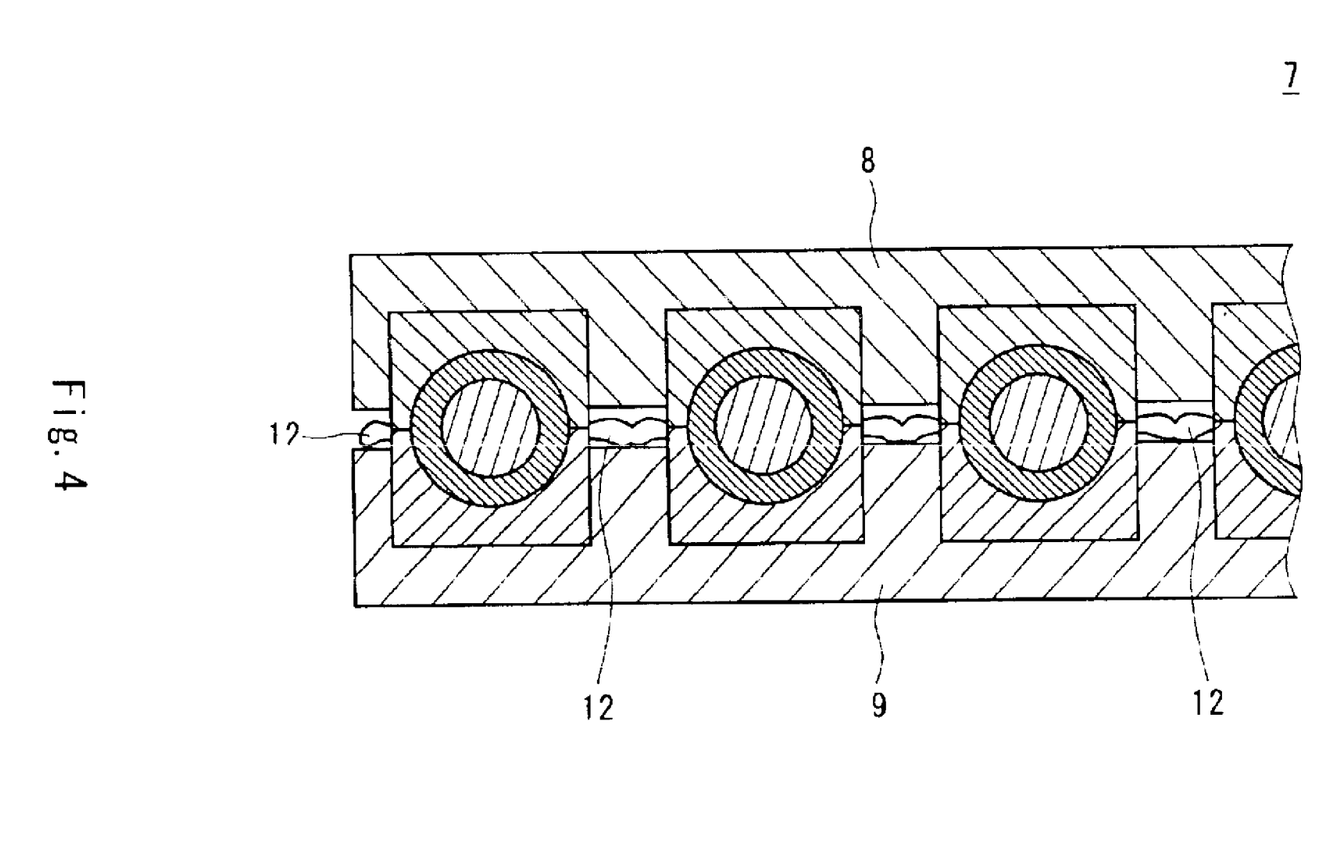
FIG. 4 is a cross sectional view illustrating a part of a mold at a stage when the clamping step is completed in the process shown in FIG. 3.

FIG. 4 is a cross sectional view illustrating a part of the mold 7 at a stage when the clamping step (STP8) is completed in the process shown in FIG. 3. As is clear from this Figure, the rubber composition that flows from the cavity adheres to the upper face of the lower portion 9. The rubber composition that flows out from each of the cavities is ring-shaped and is cured to some extent in the crosslinking step (STP9). This cured matter is referred to as molding flash 12. As is shown in FIG. 4, the molding flash 12 formed around a given cavity and the molding flash 12 formed around the adjacent cavity are connected to each other, and are integrated.

Figure 5:
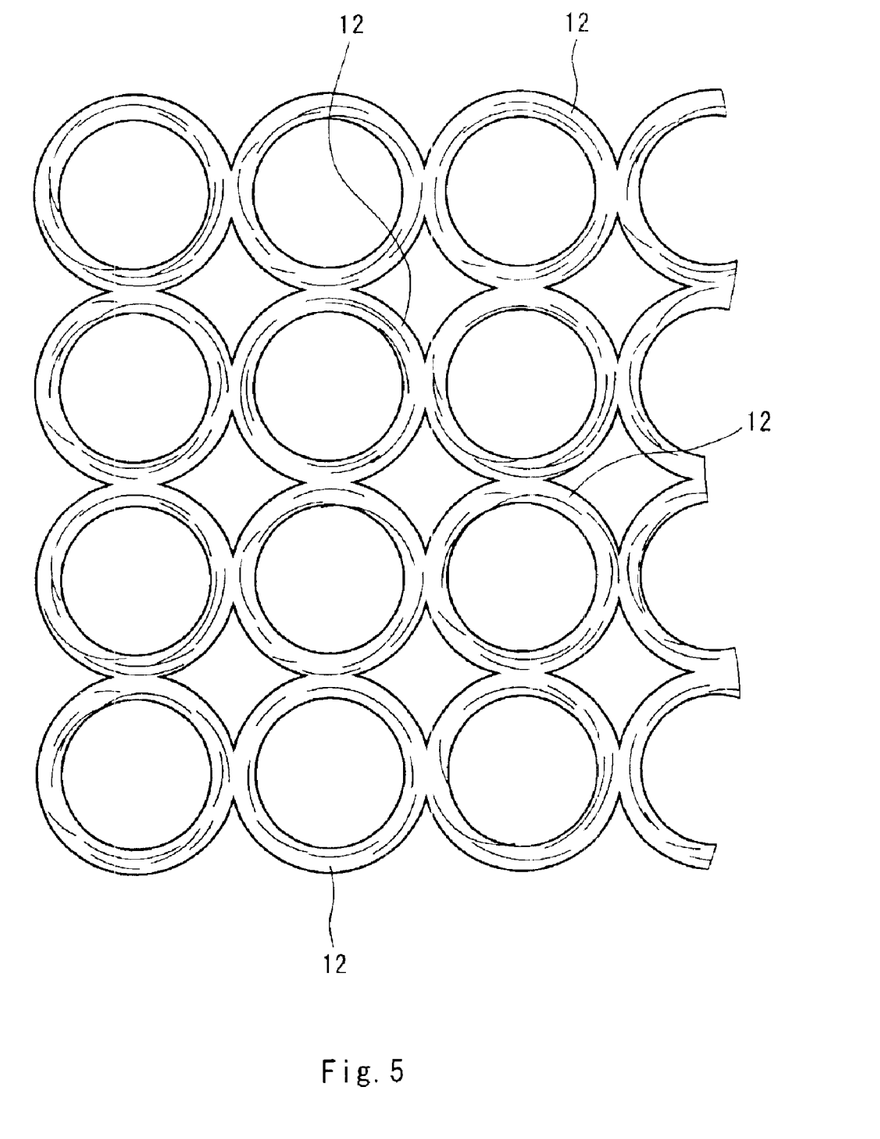
FIG. 5 is a perspective view illustrating a number of molding flashes formed in accordance with the process shown in FIG. 3.

FIG. 5 is a plan view illustrating a number of molding flashes 12 formed in accordance with the process shown in FIG. 3. As described above, each of the molding flashes is ring-shaped. Adjacent molding flashes 12 join on each other, which exhibit the form of a single sheet. All of the molding flashes 12 are removed from the mold 7 at once by pulling up one molding flash 12 which is present on an upper face of the lower portion 9 of the mold. This removing operation is markedly simple.

As described above, relative moving velocity of the lower portion 9 toward the upper portion 8 in the clamping step (STP8) is markedly slow. Accordingly, the excess rubber composition flows out in a nearly uniform manner from the periphery of the cavity, and thus the integration among adjacent molding flashes 12 is achieved. In addition, deviation of the mass of the mid layer 5 can be suppressed. The moving velocity may be set to be from 0.03 mm/s to 1.0 mm/s. When the moving velocity is below the range described above, the cycle time in the process for producing the golf ball is prolonged, resulting in insufficient productivity. In this respect, the moving velocity is more preferably equal to or greater than 0.05 mm/s, and particularly preferably equal to or greater than 0.1 mm/s. When the moving velocity is beyond the range described above, the outflow of the rubber composition may not be uniform, thereby causing situations where the joining of adjacent molding flashes 12 cannot be achieved. In this respect, the moving velocity is more preferably equal to or less than 0.8 mm/s, and particularly preferably equal to or less than 0.6 mm/s. In order to move the lower portion and the upper portion together, the lower portion 9 may be moved upwards, or the upper portion 8 may be moved downwards. Alternatively, both of the upward movement of the lower portion 9 and the downward movement of the upper portion 8 may be simultaneously executed. In any instance, the relative moving velocity is set to be in the range described above. The movement can be usually achieved by a pressing machine.

In the approaching step (STP6), pressure against the half shells 11 is scarcely imparted, and thus flow of the rubber composition hardly occurs. Therefore, even though the moving velocity in the approaching step (STP6) is set to be rapid, no adverse effects are exerted against the uniform outflow of the rubber composition. Relative moving velocity of the lower portion 9 toward the upper portion 8 in the approaching step (STP6) is preferably equal to or greater than 3.0 mm/s, and particularly preferably equal to or greater than 8.0 mm/s. The cycle time can be thereby shortened. In general, the moving velocity is set to be equal to or less than 120 mm/s.

It is preferred that the clamping step (STP8) is initiated at a point in time when the space between the upper portion 8 and the lower portion 9 becomes from 5 mm to 30 mm. When this step is initiated at a time outside of the range described above, the half shells 11 are compressed to initiate the outflow of the rubber composition similar to the approaching step (STP6), in other words, at a stage when the moving velocity is still rapid. Accordingly, the outflow of the rubber composition may lack uniformity. In this respect, the space between the upper and lower portions upon the initiation of the clamping step is more preferably equal to or greater than 7 mm, and particularly preferably equal to or greater than 10 mm. When this step is initiated at a position with a greater space from the range described above, the cycle time may be prolonged, resulting in a deteriorated productivity of the golf ball 1. In this respect, the space upon initiation is more preferably equal to or less than 25 mm, and particularly preferably equal to or less than 20 mm.

In the process for production shown in FIG. 3, the movement of the lower portion 9 is stopped during the time period between the approaching step (STP6) and clamping step (STP8), however, the clamping step (STP8) may be conducted successively to the approaching step (STP6). The clamping step (STPB) may be initiated in a state where the mold 7 is unclamped utmost, without providing the approaching step (STP6).

It is preferred that the percentage ratio of the volume of the matter placed into the spherical cavity (in this case, summation of volume of the center 4 and volume of two half shells 11) to volumetric capacity of the spherical cavity is from 103% to 120%. When the percentage ratio is less than the above range, there arise difficulties in integration among the adjacent molding flashes 12. In this respect, the percentage ratio is particularly, preferably equal to or greater than 105%. When the percentage ratio is greater than the above range, costs for the materials of the golf ball 1 are elevated.

In this respect, the percentage ratio is particularly preferably equal to or less than 110%. The inside diameter of the cavity usually ranges from 15 mm to 45 mm, and particularly, from 38 mm to 43 mm.

As a base rubber of the center 4, polybutadienes, polyisoprenes, styrene-butadiene copolymers, ethylene-propylene-diene copolymers (EPDM), natural rubbers and the like are suitable. Two or more kinds of these rubbers may be used in combination. In view of the resilience performance of the golf ball 1, polybutadienes are preferred. Even in the case where another rubber is used in combination with a polybutadiene, to employ a polybutadiene as a predominant component is preferred. Specifically, it is preferred that the ratio of the polybutadiene in total base rubber is equal to or greater than 50% by weight, and in particular, equal to or greater than 80% by weight. Among polybutadienes, high cis-polybutadienes are preferred, which have a percentage of cis-14, bond of equal to or greater than 40%, and in particular, equal to or greater than 80%.

Although mode of crosslinkage in the center 4 is not particularly limited, it is preferred that a monovalent or divalent metal salt of $\alpha,\beta$-unsaturated carboxylic acid having 3 to 8 carbon atoms is used as a co-crosslinking agent in view of the resilience performance. Specific examples of the preferable co-crosslinking agent include zinc acrylate, magnesium acrylate, zinc methacrylate and magnesium methacrylate. In particular, zinc acrylate is preferred which can result in high resilience performance. An $\alpha,\beta$-unsaturated carboxylic acid having 3 to 8 carbon atoms and a metal oxide may also be used.

The amount of the co-crosslinking agent to be blended is preferably from 10 parts to 40 parts per 100 parts of the base rubber. When the amount to be blended is below the above range, the center 4 may be so soft that insufficient resilience performance may be achieved. In this respect, the amount to be blended is more preferably equal to or greater than 15 parts, and particularly preferably equal to or greater than 20 parts. When the amount to be blended is beyond the above range, the center 4 may be so hard that soft feel at impact may not be experienced. In this respect, the amount to be blended is more preferably equal to or less than 35 parts, and particularly preferably equal to or less than 30 parts. The term "parts" used herein refers to weight ratio, i.e., parts by weight.

In the rubber composition for use in the center 4, an organic peroxide may be preferably blended. The organic peroxide serves as a crosslinking agent in conjunction with the above-mentioned metal salt of $\alpha,\beta$-unsaturated carboxylic acid, and also serves as a curing agent. By blending the organic peroxide, resilience performance of the center 4 may be improved. Suitable organic peroxide includes dicumyl peroxide, 1,1-bis(t-butylperoxy)-3,3,5-trimethylcyclohexane, 2,5-dimethyl-2,5-di(t-butylperoxy) hexane and di-t-butyl peroxide. Particularly versatile organic peroxide is dicumyl peroxide.

The amount of the organic peroxide to be blended is preferably from 0.1 parts to 3.0 parts per 100 parts of the base rubber. When the amount to be blended is below the above range, the center 4 may be so soft that insufficient resilience performance may be achieved. In this respect, the amount to be blended is more preferably equal to or greater than 0.2 parts, and particularly preferably equal to or greater than 0.5 parts. When the amount to be blended is beyond the above range, the center 4 may be so hard that soft feel at impact may not be experienced. In this respect, the amount to be blended is more preferably equal to or less than 2.8 parts, and particularly preferably equal to or less than 2.5 parts.

The rubber composition may also be blended with a filler for adjusting specific gravity thereof. Examples of the suitable filler include inorganic salts such as zinc oxide, barium sulfate, calcium carbonate and the like; and powder of highly dense metal such as tungsten, molybdenum and the like. The amount of the filler to be blended is determined ad libitum so that the intended specific gravity of the center 4 can be accomplished. Preferable filler is zinc oxide because it serves not only as an agent for adjusting specific gravity but also as a crosslinking activator.

Various additives such as anti-aging agents, coloring agents, plasticizers, dispersant and the like may be blended at an appropriate amount to the rubber composition as needed.

Specific gravity of the center 4 usually ranges from 1.05 to 1.25. Diameter of the center 4 usually ranges from 15 mm to 38 mm. The center 4 may have two or more layers.

For the mid layer 5, a rubber composition which is similar to that for the center 4 may be used. Thickness T of the mid layer is preferably from 0.5 mm to 10 mm. The mid layer 5 having a thickness T of less than the above range involves difficulties in molding. In this respect, the thickness T is particularly preferably equal to or greater than 0.6 mm. When the thickness T is beyond the above range, insufficient resilience performance of the golf ball 1 may be achieved. In this respect, thickness T is more preferably equal to or less than 9.0 mm, particularly preferably equal to or less than 6.0 mm.

The cover 3 usually contains a synthetic resin as a predominant component. As preferable synthetic resins in view of a feel at impact and resilience performance, ionomer resins and thermoplastic elastomers, and mixtures thereof are exemplified.

Of the ionomer resins, copolymers of α-olefin and α,β-unsaturated carboxylic acid having 3 to 8 carbon atoms in which part of the carboxylic acid is neutralized with a metal ion are suitable. As the α-olefin herein, ethylene and propylene are preferred. Acrylic acid and methacrylic acid are preferred as the α,β-unsaturated carboxylic acid. Metal ions for the neutralization include: alkaline metal ions such as sodium ion, potassium ion, lithium ion and the like; bivalent metal ions such as zinc ion, calcium ion, magnesium ion and the like; trivalent metal ions such as aluminum ion, neodymium ion and the like. The neutralization may also be carried out with two or more kinds of metal ions. In light of the resilience performance and durability of the golf ball 1, particularly suitable metal ion is sodium ion, zinc ion, lithium ion and magnesium ion.

Specific examples of suitable ionomer resin include "Himilan 1555", "Himilan 1557", "Himilan 1601", "Himilan 1605", "Himilan 1652", "Himilan 1705", "Himilan 1706", "Himilan 1707", "Himilan 1855", "Himilan 1856", trade names by Mitsui-Dupont Polychemical Co. Ltd.; "Surlyn® 9945", "Surlyn® 8945", "Surlyn® AD8511", "Surlyn® AD8512", trade names by Dupont; and "IOTEK 7010", "IOTEK 8000", trade names by Exxon Corporation, and the like. Two or more ionomer resins may be used in combination.

Preferable thermoplastic elastomers include thermoplastic polyurethane elastomers, thermoplastic polyamide elastomers, thermoplastic polyester elastomers, thermoplastic styrene elastomers, thermoplastic elastomers having OH groups at their ends, and the like. Two or more thermoplastic elastomers may be used in combination. In light of the resilience performance of the golf ball 1, thermoplastic polyester elastomers and thermoplastic styrene elastomers are particularly suitable.

Thermoplastic styrene elastomers (thermoplastic elastomers containing styrene blocks) include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS and hydrogenated SIBS. Exemplary hydrogenated SBS include styrene-ethylene-butylene-styrene block copolymers (SEBS). Exemplary hydrogenated SIS include styrene-ethylene-propylene-styrene block copolymers (SEPS). Exemplary hydrogenated SIBS include styrene-ethylene-ethylene-propylene-styrene block copolymers (SEEPS).

Illustrative examples of thermoplastic polyurethane elastomers include "Elastolan", trade name by BASF Polyurethane Elastomers Co., Ltd., and more specifically, "Elastolan ET880" can be exemplified. Illustrative examples of thermoplastic polyamide elastomers include "Pebax®", trade name by Toray Industries, Inc., and more specifically, "Pebax® 2533" can be exemplified. Illustrative examples of thermoplastic polyester elastomers include "Hytrel®", trade name by Dupont-Toray Co., Ltd., and more specifically, "Hytrel® 3548" and "Hytrel® 4047" can be exemplified. Illustrative examples of thermoplastic styrene elastomers include "Rabalon®", trade name by Mitsubishi Chemical Corporation, and more specifically, "Rabalon® SR04" can be exemplified.

To the cover 3, a diene block copolymer may be blended. A diene block copolymer has double bonds derived from a conjugated diene compound of a block copolymer or a partially hydrogenated block copolymer. The block copolymer comprises a polymer block of which basis being at least one vinyl aromatic compound, and a polymer block of which basis being at least one conjugated diene compound. The partially hydrogenated block copolymer can be obtained by hydrogenation of the block copolymer as described above.

Exemplary vinyl aromatic compounds that constitute the block copolymer include styrene, α-methylstyrene, vinyltoluene, p-t-butylstyrene and 1,1-diphenylstyrene, and one or more compounds are selected from these. Particularly, styrene is suitable. Conjugated diene compounds include butadiene, isoprene, 1,3-pentadiene and 2,3-dimethyl-1,3-butadiene, and one or more compounds are selected from these. In particular, butadiene and isoprene, and a combination thereof are suitable.

Preferable diene block copolymer includes: those of which structure being SBS (styrene-butadiene-styrene) having polybutadiene blocks containing epoxy groups, and those of which structure being SIS (styrene-isoprene-styrene) having polyisoprene blocks containing epoxy groups. Illustrative examples of diene block copolymer include "Epofriend®", trade name by Daicel Chemical Industries, Ltd., and more specifically, "Epofriend® A1010" can be exemplified.

Coloring agents such as titanium dioxide and the like, fillers such as barium sulfate and the like, dispersants, anti-aging agents, ultraviolet absorbers, light stabilizers, fluorescent agents, fluorescent bleaching agents and the like may be blended at an appropriate amount in the cover 3 as needed. Specific gravity of the cover 3 usually ranges from 0.9 to 1.4.

Thickness of the cover 3 preferably ranges from 0.5 mm to 2.5 mm. The cover 3 having thickness of below the above range is involved in difficulties in molding, and moreover, deteriorated durability of the golf ball 1 may be accompanied thereby. In this respect, the thickness is more preferably equal to or greater than 1.0 mm, and particularly preferably equal to or greater than 1.1 mm. When the thickness is beyond the above range, unpleasant feel at impact may be experienced. In this respect, the thickness is particularly preferably equal to or less than 2.4 mm. The cover 3 may have two or more layers. Another mid layer may be formed between the cover 3 and the mid layer 5.

The process for production according to the present invention, in which the moving velocity in the clamping step is set to be slow, is suitable for molding one-piece golf balls, cores for a two-pieces golf ball, as well as centers for a three-pieces golf ball, and the like. When a one-piece golf ball is formed, a mold is used with the inside diameter of the cavity being from 40 mm to 45 mm. When a core of a two-pieces golf ball is formed, a mold is used with the inside diameter of the cavity being from 38 mm to 43 mm. When a center of a three-pieces golf ball is formed, a mold is used with the inside diameter of the cavity being from 15 mm to 40 mm. In any case, crosslinking temperature is set to be from 120° C. to 180° C., whilst the crosslinking time period set to be from 10 minutes to 40 minutes.

EXAMPLES

Example 1

A rubber composition was obtained by kneading 100 parts of polybutadiene ("BR01", trade name by JSR Corporation), 25 parts of zinc acrylate, 22 parts of zinc oxide and 1.0 part of dicumyl peroxide in an internal kneading machine. This rubber composition was placed in a mold having a spherical cavity, kept at 142° C. for 23 minutes and further kept at 168° C. for 6 minutes to obtain a center having a diameter of 30.2 mm.

Next, a rubber composition was obtained by kneading 80 parts of polybutadiene ("BR01", trade name, supra), 20 parts of another polybutadiene ("BR10", trade name, supra), 34 parts of zinc acrylate, 16.3 parts of zinc oxide and 1.0 part of dicumyl peroxide in an internal kneading machine. This rubber composition was placed into a mold and compressed to give a half shell. The center was covered with two of the half shells, and the center and the half shells were placed into a mold shown in FIG. 2. Thereafter, the lower portion was moved upwards at a moving velocity of 10 mm/s until the space between the upper portion and the lower portion becomes 15 mm, and then the movement was terminated. Immediately after this operation, the lower portion was further moved upwards at a moving velocity of 0.5 mm/s while having the rubber composition outflow from the cavities, and the upper portion and the lower portion were brought into contact. Then, crosslinking reaction of the rubber was caused to form a core including a center and a mid layer. Employed crosslinking temperature was 150° C., whilst the crosslinking time period was 20 minutes. Thereafter, the mold was unclamped, and a core and a molding flash were removed.

Examples 2 to 5 and Comparative Example 1

In a similar manner to Example 1 except that the moving velocity in the clamping step was altered as represented in Table 1 below, a core was formed.

Examples 6 to 10

In a similar manner to Example 1 except that the space between the upper and lower portions upon initiation of the clamping step was altered as represented in Table 2 below, a core was formed.

Comparative Example 2

In a similar manner to Example 1 except that the upper portion and the lower portion were brought into contact by moving the lower portion upwards at a moving velocity of 10 mm/s, from a state where the mold is unclamped utmost, a core was formed.

Example 11

In a similar manner to Example 1 except that the upper portion and the lower portion were brought into contact by moving the lower portion upwards at a moving velocity of 1.0 mm/s, from a state where the mold is unclamped utmost, a core was formed.

Evaluation of Working Property

Facility in removing operation of the molding flash was evaluated by an operator. A case where the molding flash was extremely ready to be removed, it was evaluated as "A"; a case where the molding flash was rather difficult to be removed, it was evaluated as 'B'; and a case where the molding flash was difficult to be removed and thus long time period is required for the operation was evaluated as "C". The results of evaluation are shown in Table 1 and Table 2 below.

Evaluation of Mass Deviation

Four positions for the measuring point equally spaced were selected along a seam on the surface of the mid layer, and further, additional positions for the measuring point were also selected which corresponded to bipolar points when this seam is assumed as an equator of a globe. Accordingly, thickness of the mid layer was measured at 6 positions in total. A maximum value among 6 data was determined as Tmax, while the minimum value among them was determined as Tmin. Deviation of mass was determined as a value: (Tmax−Tmin). Average values of deviation of mass from 10 golf balls was calculated, and the case where this average value was less than 0.5 mm was evaluated as "A", and the case where this average value was equal to or greater than 0.5 mm was evaluated as "B". The results of evaluation are shown in Table 1 and Table 2 below.

TABLE 1

Results of Evaluation

|  | Example 2 | Example 3 | Example 1 | Example 4 | Example 5 | Comparative Example 1 |
|---|---|---|---|---|---|---|
| Moving velocity in approaching step (mm/s) | 10 | 10 | 10 | 10 | 10 | 10 |
| Space upon initiation of clamping step (mm) | 15 | 15 | 15 | 15 | 15 | 15 |
| Moving velocity in clamping step (mm/s) | 0.03 | 0.05 | 0.5 | 0.8 | 1.0 | 2.0 |
| Working property in removing molding flash | A | A | A | A | B | C |
| Cycle time | slightly long | slightly long | short | short | short | short |
| Deviation of mass | A | A | A | A | A | B |

TABLE 2

Results of Evaluation

|  | Example 6 | Example 7 | Example 8 | Example 9 | Example 10 | Comparative Example 2 | Example 11 |
|---|---|---|---|---|---|---|---|
| Moving velocity in approaching step (mm/s) | 10 | 10 | 10 | 10 | 10 | 10 | 1.0 |
| Space upon initiation of clamping step (mm) | 3 | 5 | 20 | 30 | 40 | — | — |
| Moving velocity in clamping step (mm/s) | 0.5 | 0.5 | 0.5 | 0.5 | 0.5 | 10 | 1.0 |
| Working property in removing molding flash | B | A | A | A | A | C | B |
| Cycle time | short | short | short | short | slightly long | short | long |
| Deviation of mass | A | A | A | A | A | B | A |

As is shown in Table 1 and Table 2, in accordance with the process for production of the Examples, working property was excellent, and deviation of mass of resulting mid layer is small. Accordingly, advantages of the present invention are clearly indicated by these results of evaluation.

The description herein above is merely for illustrative examples, and therefore, various modifications can be made without departing from the principles of the present invention.

What is claimed is:

1. A process for producing a golf ball which comprises:
   placing a rubber composition into the cavity of a mold having an upper and a lower portion
   clamping the upper portion and the lower portion together at a moving velocity of from 0.03 mm/s to 1.0 mm/s, causing excess rubber composition to substantially uniformly flow out from the cavities; thereby forming many ring-shaped rubber flashes and
   unclamping the mold and removing from the mold cavity spherical bodies and the associated rubber flashes formed in the mold cavities.

2. The process for producing a golf ball according to claim 1, wherein the ring-shaped, molded flashes form an integrated sheet.

3. The process for producing a golf ball according to claim 1, wherein the rubber flashes removed in the removing step is in the form of a sheet which has many ring-shaped molded flashes.

4. The process for producing a golf ball according to claim 1, wherein the rubber composition is placed into the cavity surrounding a spherical center.

5. The process for producing a golf ball according to claim 1, wherein the percentage ratio of the volume of rubber composition placed into the spherical cavity to the volumetric capacity of the spherical cavity formed by the upper and lower portions of the mold is 103% to 120%.

6. The process for producing a golf ball according to claim 1 prior to said clamping step, wherein the upper and lower portions of the mold are brought in close proximity to each other at a moving velocity equal to or greater than 3.0 mm/s.

7. The process for producing a golf ball according to claim 6, wherein the clamping step is initiated at a point in time when the space between the upper portion and the lower portion of the mold is from 5 mm to 30 mm.

8. The process for producing golf ball according to claim 6, wherein the moving velocity prior to the clamping step is 3 to 120 mm/s.

* * * * *